United States Patent
Thomas et al.

(10) Patent No.: US 8,417,998 B2
(45) Date of Patent: Apr. 9, 2013

(54) TARGETED BLACK BOX FUZZING OF INPUT DATA

(75) Inventors: Gavin Shane Thomas, Cheltenham (GB); Nitin Kumar Goel, Bothell, WA (US); Mark Wodrich, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 12/794,781

(22) Filed: Jun. 7, 2010

(65) Prior Publication Data

US 2011/0302455 A1    Dec. 8, 2011

(51) Int. Cl.
G06F 11/263    (2006.01)
G06F 11/00    (2006.01)

(52) U.S. Cl. ............. 714/38.1; 714/25; 714/32; 714/37; 717/124

(58) Field of Classification Search ............ 714/25, 714/26, 32, 33, 37, 38.1, 41, 45, 47.1; 717/124, 717/125, 128
See application file for complete search history.

(56) References Cited

U.S. PATENT DOCUMENTS

| | | | |
|---|---|---|---|
| 7,047,521 B2 | 5/2006 | Bunnell | |
| 7,089,537 B2 | 8/2006 | Das et al. | |
| 7,155,708 B2 | 12/2006 | Hammes et al. | |
| 7,594,142 B1 | 9/2009 | O'Leary et al. | |
| 2006/0021054 A1 | 1/2006 | Costa et al. | |
| 2007/0006314 A1 | 1/2007 | Costa et al. | |
| 2007/0250820 A1 | 10/2007 | Edwards et al. | |
| 2008/0229286 A1 | 9/2008 | Kahlon | |
| 2008/0301647 A1 | 12/2008 | Neystadt et al. | |
| 2008/0320328 A1* | 12/2008 | O'Leary ......................... | 714/25 |
| 2009/0164478 A1 | 6/2009 | Natanov et al. | |
| 2009/0164975 A1 | 6/2009 | Natanov et al. | |
| 2009/0204591 A1* | 8/2009 | Kaksonen ...................... | 717/124 |
| 2010/0058475 A1 | 3/2010 | Thummalapenta et al. | |
| 2010/0281460 A1* | 11/2010 | Tillmann et al. .............. | 717/128 |
| 2011/0055813 A1* | 3/2011 | Calendino et al. ............ | 717/124 |

OTHER PUBLICATIONS

Ganesh, et al., "Taint-based Directed Whitebox Fuzzing", Retrieved at << http://people.csail.mit.edu/rinard/paper/icse09.pdf >>, International Conference on Software Engineering, Proceedings of the 31st International Conference on Software Engineering, May 16-24, 2009, pp. 1-11.

Schwartz, et al., "All You Ever Wanted to Know about Dynamic Taint Analysis and Forward Symbolic Execution (but might have been afraid to ask)", Retrieved at <<http://www.ece.cmu.edu/~ejschwar/papers/oakland10.pdf>>, Proceedings of the 2010, IEEE Symposium on Security and Privacy, 2010, pp. 15.

(Continued)

*Primary Examiner* — Joseph D Manoskey
(74) *Attorney, Agent, or Firm* — Hope Baldauff Hartman, LLC (57) ABSTRACT

Technologies are described herein for performing targeted, black-box fuzzing of input data for application testing. A dataflow tracing module traces an application while it reads and processes a set of template data to produce operation mapping data that maps data locations in the template data to operations performed by the application in processing the data at the location. The tracing is performed without requiring the application source code, knowledge of the syntactical structure of the input data, or specially instrumented binaries for the application. A fuzzing module is then utilized to target a specific operation or operations in the application by fuzzing data locations within the template data according to the operation mapping data until the desired outcome is achieved.

20 Claims, 4 Drawing Sheets

OTHER PUBLICATIONS

Drewry, et al., "Flayer: Exposing Application Internals", Retrieved at http://www.usenix.org/event/woot07/tech/full_papers/drewry/drewry.pdf >>, Proceedings of the first USENIX workshop on Offensive Technologies, Aug. 6-10, 2007, pp. 9.

Newsome, et al., "Dynamic Taint Analysis for Automatic Detection, Analysis, and Signature Generation of Exploits on Commodity Software", Retrieved at <<http://valgrind.org/docs/newsome2005.pdf >>, in Proceedings of the Network and Distributed System Security Symposium, (NDSS 2005), 2005, pp. 17.

Branco, Rodrigo R., "Letting your fuzzer know about target's internals", Retrieved at << http://ysts.org/YSTS3-files/YSTS3-RodrigoBranco-Letting%20your%20fuzzer%20know%20about%20targets%20internals.pdf >>, pp. 1-41.

Wang, et al., "TaintScope: A Checksum-Aware Directed Fuzzing Tool for Automatic Software Vulnerability Detection", Retrieved at <<http://faculty.cs.tamu.edu/guofei/paper/TaintScope-Oakland10.pdf >>, In Proceedings of the 31st IEEE Symposium on Security & Privacy, May 2010, pp. 497-512.

U.S. Official Action dated Jul. 5, 2012 in U.S. Appl. No. 12/489,446.

Chang et al., "Efficient and Extensible Security Enforcement Using Dynamic Data Flow Analysis", Oct. 27-31, 2008, Proceedings of the 15$^{th}$ ACM Conference on Computer and Communications Security, pp. 39-50.

Cheng et al. "TaintTrace: Efficient Flow Tracing with Dynamic Binary Rewriting", 2006 Proceedings of the 11th IEEE Symposium on Computers and Communications (ISCC'06), pp. 749-754.

McCamant et al., "Quantitative Information-Flow Tracking for C and Related Languages", Nov. 17, 2006, Retrieved at http://groups.csail.mit.edu/pag/pubs/secret-tracking-tr076.pdf, pp. 20.

Kalkusch et al., "Extending the Scene Graph with a Dataflow Visualization System", 2006, Proceedings of the ACM Symposium on Virtual Reality Software and Technology, pp. 252-260.

Reps et al., "Precise Interprocedural Dataflow Analysis via Graph Reachability", 1995, Proceedings of the 22$^{nd}$ ACM SIGPLAN-SIGACT Symposium on Principles of Programming Languages, pp. 49-61.

Newsome et al., "Dynamic Taint Analysis for Automatic Detection, Analysis, and Signature Generation of Exploits on Commodity Software", 2005, pp. 17.

Chen et al., "From Speculation to Security: Practical and Efficient Information Flow Tracking Using Speculative Hardware", Jun. 21-25, 2008, Proceedings of 35$^{th}$ International Symposium on Computer Architecture (ISCA '08), pp. 401-412.

U.S. Notice of Allowance dated Dec. 24, 2012 in U.S. Appl. No. 12/489,446.

* cited by examiner

TARGETED BLACK BOX FUZZING OF INPUT DATA

BACKGROUND

Computer software applications that read and process input data supplied by an external source, i.e. data not under the control of the software application, may be vulnerable to error or attack by corrupted or specifically malformed input data. Such applications include, but are not limited to, productivity-type applications that read input files with user-created data, network modules that receive input data over a network connection, and the like. These vulnerabilities may not be found through traditional testing methodologies used during development of the application software that test the application software using conditions generated from knowledge of the application source code, boundary conditions, parameter values, and the like.

Additional testing of the application software may be accomplished utilizing fuzzing mechanisms that randomly modify or "fuzz" the contents of input data to the application in order to test the response of the application to corrupt or malformed data. However, many large and complex applications may have countless numbers of input data parsing routines located deep in the programmatic structure of the application. Randomly fuzzing every potential byte of a large set of input data in an attempt to test a particular parsing routine may be time consuming and impractical. Further, because many applications have high-level syntactical checks to validate the structure of the input data, randomly changing multiple bytes of the input data may ensure that the deeper input data parsing routines are never touched by the fuzzed input data.

It is with respect to these considerations and others that the disclosure made herein is presented.

SUMMARY

Technologies are described herein for performing targeted fuzzing of input data for application testing. The targeted fuzzing is performed without requiring the application source code, knowledge of the syntactical structure of the input data, or specially instrumented binaries for the application. This is generally referred to as "black box" fuzzing or testing. Utilizing the targeted black box fuzzing techniques described herein, input data for an application may be fuzzed to detect vulnerabilities at a specific operation or set of functions in the application without having to randomly fuzz the entire input data and without running afoul of high-level syntactical checks of the application's input data parsing mechanism. This allows for more efficient testing of an application than traditional random fuzzing processes.

According to embodiments, a dataflow tracing module is utilized to perform tracing of an application while it reads and processes a set of template data containing syntactically complete input data. The dataflow tracing module produces operation mapping data that maps data locations in the template data to operations performed by the application in processing the data at the location. A fuzzing module is then utilized to target a specific operation or operations in the application by fuzzing data locations within the template data according to the operation mapping data until the desired outcome is achieved.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for performing targeted, black box fuzzing of input data for application testing. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
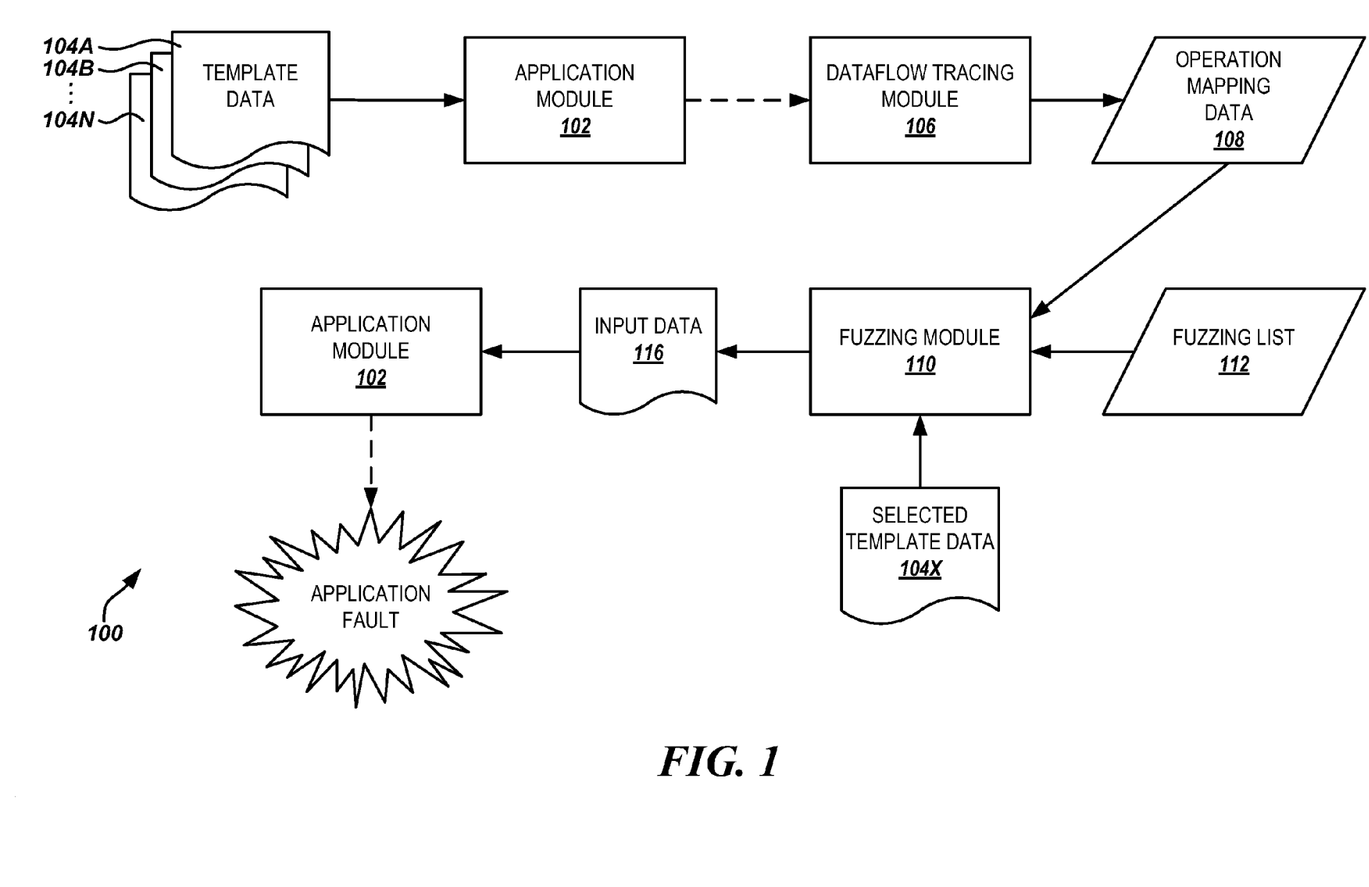
FIG. 1 is a block diagram showing aspects of an illustrative operating environment and several software components provided by the embodiments presented herein.

FIG. 1 shows an illustrative operating environment 100 including several software components for performing targeted, black box fuzzing of input data for application testing, according to embodiments provided herein. The environment 100 includes an application module 102 that is the target of the application testing. The application module 102 may be a productivity-type application that reads input files with user-created data, such as MICROSOFT EXCEL® spreadsheet software from Microsoft, Corp. of Redmond, Wash. The application module 102 may also be a network module that reads incoming data across a network, such as Web server module that responds to hypertext transfer protocol ("HTTP") requests. It will be appreciated that the application module 102 may be any program module that reads input data supplied by an external source, i.e. not internally controlled, and thus may be vulnerable to error or attack by corrupted or specifically malformed input data.

The environment 100 also includes a set of template data 104A-104N (also referred to herein generally as template data 104). The template data 104 contains simulated input data to be read and processed by the application module 102. For example, the template data 104 may consist of spreadsheet files that are read by the spreadsheet application module described above. Alternatively, the template data 104 may contain individual HTTP messages to be sent to the Web server application module over a simulated network connection. The set of template data 104 may be created or selected by the developer of the application module 102 using knowledge of the input data parsing mechanism of the module. The set of template data 104 may also be created or selected by an application tester testing the application module through iterative used of the dataflow tracing module 106 described below.

The amount, type, and scope of the data contained within the set of template data 104 may depend on the target application module 102. It will be appreciated that the application module 102 contains instructions, operations, functions, and/or routines that are responsible for reading and processing input data, such as that contained in the template data 104. The set of template data 104 may be created or selected such that it provides a broad range of "code coverage," i.e. the broadest feasible amount of instructions/operations within the application module 102 are utilized in reading and processing the input data contained in the templates. According to one embodiment, the set of template data 104 may contain syntactically correct or complete input data such that basic syntax validation routines of the application module 102 are satisfied and deeper routines and functions of the parsing mechanism may be accessed while reading and processing the input data contained therein.

The environment further includes a dataflow tracing module 106. The dataflow tracing module 106 monitors the application module 102 as it reads and processes input data, such as that contained in the template data 104, and records the operations/instructions executed by the application module during the parsing of the input data. For example, the dataflow tracing module 106 may monitor a spreadsheet application module 102 while the application module parses one of the spreadsheet files from the template data 104. Similarly, the dataflow tracing module 106 may monitor the Web server application module 102 as the application module receives an HTTP request contained in the template data 104 over a simulated network connection. The dataflow tracing module 106 records the locations of the assembly language instructions executed by the application module 102 as it parses each individual byte of the input data. This is accomplished without the need for specially instrumented binaries for the application module 102 and without knowledge of the source code of the application module or the syntactical structure of the input data, as is described in more detail below in regard to FIG. 3.

According to embodiments, the dataflow tracing module 106 is utilized to monitor the application module 102 as it reads and processes the template data 104 described above. The dataflow tracing module 106 records the locations of the operations/instructions executed by the application module 102 in response to parsing each byte of the template data 104. Each operation/instruction executed in response to parsing a particular byte of the input data is said to be "tainted" by that byte of the input data. The locations of the operations/instructions tainted by each byte of the template data 104 are recorded in operation mapping data 108, which will be described in more detail below in regard to FIG. 2.

The operation mapping data 108 may then be utilized by a fuzzing module 110 to perform targeted fuzzing of input data for the application module 102 in order to test the application module or to reproduce a particular scenario, such as an application crash. The fuzzing module 110 fuzzes specific bytes of the input data based on the operation mapping data 108 and a fuzzing list 112 containing a list of instructions or operations in the application module 102 to target. In one embodiment, the fuzzing list 112 consists of specific instruction addresses within the application module 102 where the target operations/instructions reside. The target operations/instructions in the fuzzing list 112 may be identified from an error log resulting from a crash of the application module 102, for example. Alternatively, the fuzzing list 112 may contain several operations/instructions in the application module 102 suspected of being particularly vulnerable to attack by corrupted or malformed input data. It will be appreciated that the fuzzing list 112 may contain any number of target operations/instructions up to and including the entire set of tainted instructions in the application module 102.

According to embodiments, the fuzzing module 110 is able to fuzz the input data for the application module 102 without knowledge of the syntactical structure of the input data or the program structure of the parsing mechanism of the application module. The fuzzing module 110 utilizes the operations/instructions in the fuzzing list 112 to query the operation mapping data 108 and determine the individual byte or bytes from the various template data 104 that taint the targeted operations/instructions in the application module 102. The fuzzing module 110 may then utilize known fuzzing algorithms to fuzz the one or more bytes of selected template data 104X to create input data 116 to be read and processed by the application module 102, in order to re-create the desired scenario. As will be described in more detail below in regard to FIG. 3, the fuzzing module 110 may create multiple instances of the input data 116 by successively fuzzing several bytes or combination of bytes in the selected template data 104X in order to create the desired scenario in the application module 102, such as a specific application crash.

Figure 2:
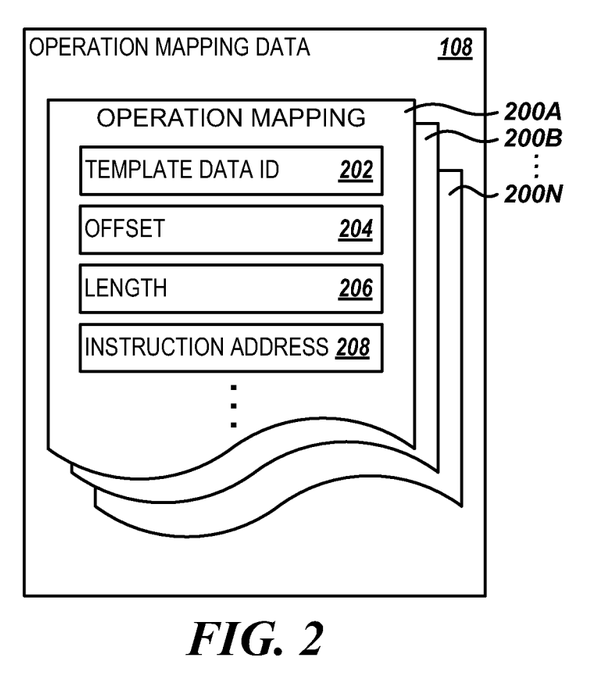
FIG. 2 is a data structure diagram illustrating a number of data elements stored in operation mapping data, according to embodiments presented herein.

Turning now to FIG. 2, one or more data structures containing a number of data elements will be described. It will be appreciated by one skilled in the art that the data structures shown in the figures may represent rows in a database table, objects stored in a computer memory, programmatic structures, or any other data containers commonly known in the art. Each data element included in the data structures may represent one or more fields or columns of a database row, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

In particular, FIG. 2 shows one example of data elements that may be stored in the operation mapping data 108, according to embodiments. As described above, the operation mapping data 108 contains information regarding the operations/instructions in the application module 102 tainted by specific bytes in the template data 104. In one embodiment, the operation mapping data 108 consists of a number of operation mappings 200A-200N (also referred to generally herein as operation mapping 200). Each operation mapping 200 may contain a template data ID 202 identifying one of the set of templates data 104, an offset 204 and length 206 identifying a location of a specific byte or range of bytes in the identified template data, and an instruction address 208 identifying the location of the operations/instructions within the application module 102 tainted by the identified byte(s).

It will be appreciated that the operation mapping 200 may contain additional information regarding the mapping of the specific byte(s) in the template data 104 to the tainted instruction address 208, beyond that shown in FIG. 2. It will be further appreciated that the operation mapping data 108 may consist of thousands or millions of operation mappings 200, and that a byte at a particular offset 204 in an identified template data 104 may taint hundreds or thousands of individual instruction addresses 206 within the application module 102. According to one embodiment, data optimization routines may be utilized to optimize the operation mapping data 108, by removing multiple operation mappings 200 identifying different offsets 204 in the template data 104 that taint the same operation/instruction at a particular instruction address 208, for example. The operation mapping data 108 may further be stored in a database system, allowing the large number of operation mappings 200 to be efficiently indexed and queried.

Figure 3:
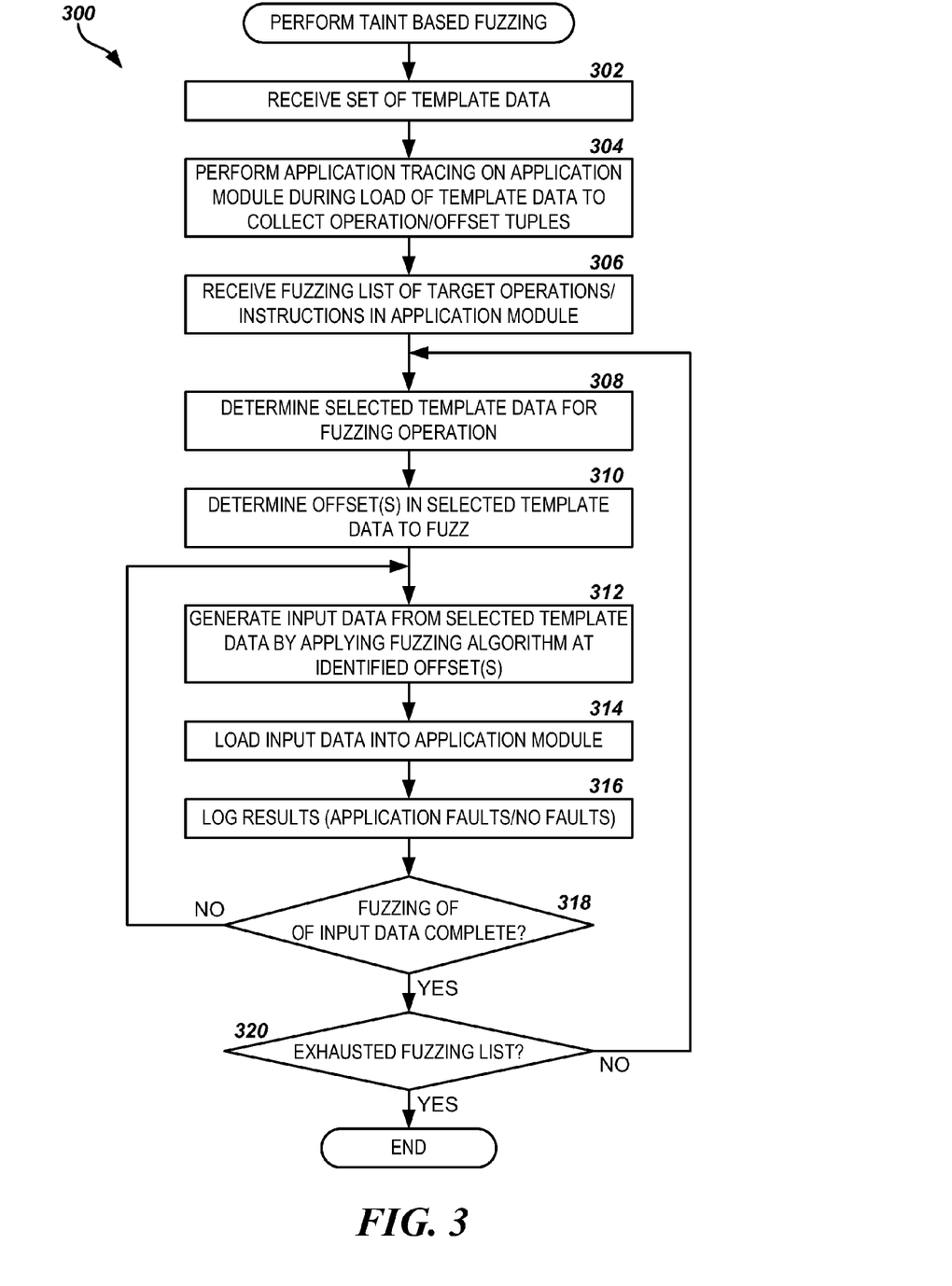
FIG. 3 is a flow diagram showing methods for performing targeted, black box fuzzing of input data, according to embodiments described herein.

Referring now to FIG. 3, additional details will be provided regarding the embodiments presented herein. It should be appreciated that the logical operations described with respect to FIG. 3 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 3 illustrates a routine 300 for performing the targeted fuzzing of input data for application testing, according to embodiments described herein. The routine 300 may be performed by a combination of the dataflow tracing module 106 and the fuzzing module 110 executing on a desktop computer, workstation, laptop, notebook, application server, Web server, or any other computing device known in the art. It will be appreciated that the routine 300 may also be performed by other modules or components executing on other computing devices, or by any combination of modules, components, and computing devices.

The routine 300 begins at operation 302, where the dataflow tracing module 106 receives a set of template data 104 to be read and processed by the application module 102 in order to produce the operation mapping data 108. As described above in regard to FIG. 1, the set of template data 104 may be created or selected by the developer of the application module 102 using knowledge of the input data parsing mechanism of the module or the template data may be selected by repeated analysis using the dataflow tracing module 106 during the reading and parsing by the application module of a variety of input data until the desired code coverage has been accomplished.

From operation 302, the routine 300 proceeds to operation 304, where the dataflow tracing module 106 monitors the instruction/operations executed the application module 102 as each of the identified set of template data 104 is read and processed by the application. As described above in regard to FIG. 1, this is accomplished without the need of specially instrumented binaries for the application module 102 and without knowledge of the source code of the application module or the syntactical structure of the input data. According to one embodiment, the dataflow tracing module 106 operates using a methodology such as that described in co-pending U.S. patent application Ser. No. 12/489,446, filed Jun. 10, 2009, and entitled "Tracing of Data Flow," which is incorporated by reference herein in its entirety.

The dataflow tracing module 106 records the locations of instruction/operations within the application module 102 tainted by each byte of the template data 104 in operation mappings 200 in the operation mapping data 108, as described above in regard to FIG. 2. As further described above in regard to FIG. 2, the dataflow tracing module 106 may perform optimization routines on the operation mapping data 108 to remove multiple operation mappings 200 identifying different offsets 204 in the template data 104 that similarly taint the same operation/instruction at a particular instruction address 208, for example.

The routine 300 then proceeds from operation 304 to operation 306, where the fuzzing module 110 receives a list of operations/instructions in the application module 102 to target with the fuzzing operation. As described above in regard to FIG. 1, the target operations/instructions may be identified by instruction addresses contained in the fuzzing list 112. The target operations/instructions in the fuzzing list 112 may be identified from an error log resulting from a crash of the application module 102, for example. Alternatively, the fuzzing list 112 may contain the addresses of operations/instructions in the application module 102 suspected of being particularly vulnerable to attack by corrupted or malformed input data.

From operation 306, the routine 300 proceeds to operation 308, where the fuzzing module 110 searches the operation mappings 200 in the operation mapping data 108 to determine a first selected template data 104X from the set of template data 104 containing input data that taints the target operation/instruction. The selected template data 104X may be determined from the template data ID 202 in the operation mapping 200 or mappings containing the instruction address 208 of the target operation/instruction. The routine 300 then proceeds to operation 310, where the fuzzing module 110 further determines the offset(s) 204 and length(s) 206 identifying the byte(s) of the selected template data 104X to be fuzzed to produce the input data 116. The offset(s) 204 and length(s) 206 may further be determined from the operation mapping 200 or mappings in the operation mapping data 108 having the template data ID 202 corresponding to the selected template data 104× and instruction address 208 of the target operation/instruction.

The routine 300 proceeds from operation 310 to operation 312, where the fuzzing module 110 generates the input data 116 by fuzzing one or more bytes of the selected template data 104X at the determined offset(s) 204. The fuzzing module 110 may fuzz the one or more bytes with all valid values for the byte(s), or with random values within that range. In one embodiment, the fuzzing module 110 fuzzes the bytes utilizing a selected set of values, known as "super values." The type of fuzzing performed may depend on the fuzzing algorithm implemented in the fuzzing module 110. Any number of fuzzing algorithms known in the art may be utilized.

In one embodiment, the fuzzing module 110 may fuzz multiple, non-adjacent bytes based on the identified offsets 204 from the operation mapping data 108. This is referred to as "relationship fuzzing." Relationship fuzzing may allow the fuzzing module 110 to recreate the desired scenario, such as an application crash, in much less time than a traditional fuzzer fuzzing non-targeted single bytes or multiple, adjacent bytes. It will be appreciated that the fuzzing module 110 may fuzz the one or more bytes of the selected template data 104X based on the offset(s) 204 and length(s) 206 from the operation mapping data 108 and that no knowledge of the syntactical structure of the input data is required by the fuzzing module.

It will be further appreciated that the fuzzing module 110 may generate a number of successive instances of the input data 116 with the one or more bytes of the selected template data 104X containing differently fuzzed values. For each successive instance of the input data 116, the routine 300 proceeds to operation 314, where the application module 102 is caused to read and process the generated input data. Next, at operation 316, the result of loading and processing the input data 116, including any application faults or crashes, is logged by the fuzzing module 110.

From operation 316, the routine 300 proceeds to operation 318, where the fuzzing module 110 determines if the fuzzing algorithm has been exhausted for the one or more bytes of the selected input data 104X. If the fuzzing of the selected input data 104X is not complete, the routine 300 returns to operation 312, where the next successive instance of the input data 116 is generated and the process is repeated. If the fuzzing of the selected input data 104X is complete, then the routine 300 proceeds from operation 318 to operation 320, where the fuzzing module determines if all the operations/instructions identified in the fuzzing list 112 have been targeted by the black box fuzzing operation. If all of the operations/instructions in the fuzzing list 112 have not been targeted, then the routine 300 returns to operation 308, where the black box fuzzing operation is repeated for the next target operation/instruction. Once all of the operations/instructions in the fuzzing list 112 have been targeted, the routine 300 ends.

It will be appreciated that a large number of instances of input data 116 may be generated by the fuzzing module 110 and loaded by the application module 102 before the desired results, such as an application crash, are obtained. However, because the fuzzed bytes of the input data are targeted based on the operation mapping data 108 described above, the number of instances of the input data 116 needed to obtain the desired results should be significantly less than traditional random fuzzing mechanisms. In addition, because the template data 104 contains syntactically correct or complete input data, the black box fuzzing of the input data using the techniques described above can target lower-level routines in the parsing mechanism of the application module 102 without running afoul of higher-level syntax validation of the input data.

Figure 4:
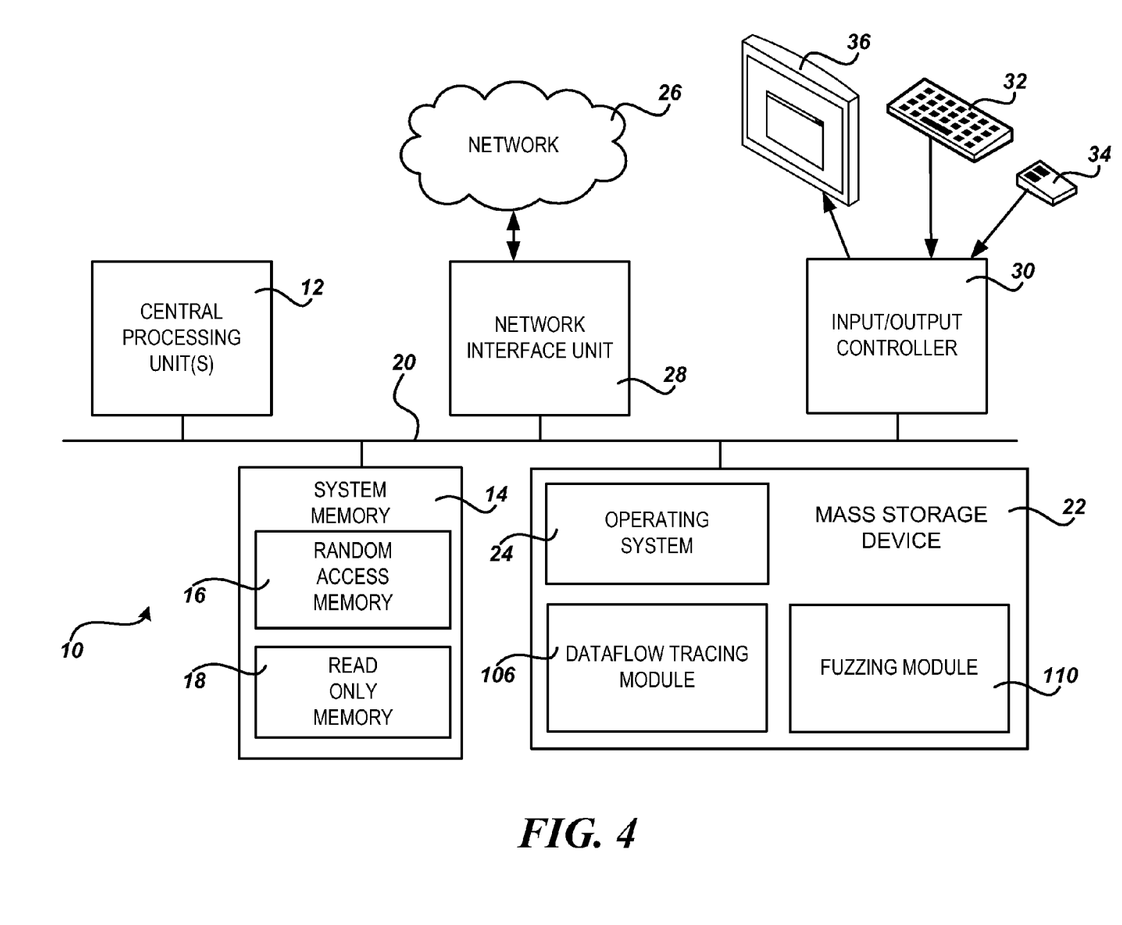
FIG. 4 is a block diagram showing an illustrative computer hardware and software architecture for a computing system capable of implementing aspects of the embodiments presented herein.

FIG. 4 shows an example computer architecture for a computer 10 capable of executing the software components described herein for performing targeted black box fuzzing of input data for application testing, in the manner presented above. The computer architecture shown in FIG. 4 illustrates a conventional desktop computer, laptop, notebook, server computer, PDA, digital cellular phone, or other computing device, and may be utilized to execute any aspects of the software components presented herein described as executing on a computer.

The computer architecture shown in FIG. 4 includes one or more central processing units ("CPUs") 12. The CPUs 12 may be standard processors that perform the arithmetic and logical operations necessary for the operation of the computer 10. The CPUs 12 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 14, including a random access memory ("RAM") 16 and a read-only memory 18 ("ROM"), and a system bus 20 that couples the memory to the CPUs 12. A basic input/output system containing the basic routines that help to transfer information between elements within the computer 10, such as during startup, is stored in the ROM 18. The computer 10 also includes a mass storage device 22 for storing an operating system 24, application programs, and other program modules, which are described in greater detail herein.

The mass storage device 22 is connected to the CPUs 12 through a mass storage controller (not shown) connected to the bus 20. The mass storage device 22 provides non-volatile storage for the computer 10. The computer 10 may store information on the mass storage device 22 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 10 may store information to the mass storage device 22 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 10 may further read information from the mass storage device 22 by detecting the physical states or characteristics of one or more particular locations within the mass storage device.

As mentioned briefly above, a number of program modules and data files may be stored in the mass storage device 22 and RAM 16 of the computer 10, including an operating system 28 suitable for controlling the operation of a computer. The mass storage device 22 and RAM 16 may also store one or more program modules. In particular, the mass storage device 22 and the RAM 16 may store the application module 102, the dataflow tracing module 106, and/or the targeted fuzzing module 110, both of which were described in detail above in regard to FIG. 1. The mass storage device 22 and the RAM 16 may also store other types of program modules or data.

In addition to the mass storage device 22 described above, the computer 10 may have access to other computer-readable storage media to store and retrieve information, such as program modules, data structures, or other data. By way of example, and not limitation, computer-readable storage media may include volatile and non-volatile, removable and non-removable media implemented in any method or technology for the non-transitory storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information in a non-transitory fashion and that can be accessed by the computer 10.

The computer-readable storage medium may be encoded with computer-executable instructions that, when loaded into the computer 10, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 10 by specifying how the CPUs 12 transition between states, as described above. According to one embodiment, the computer 10 may have access to computer-readable storage media storing computer-executable instructions that, when executed by the computer, perform the routine 300 for performing targeted black box fuzzing of input data for an application, described above in regard to FIG. 3.

According to various embodiments, the computer 10 may operate in a networked environment using logical connections to remote computing devices and computer systems through a network 26, such as a LAN, a WAN, the Internet, or a network of any topology known in the art. The computer 10 may connect to the network 26 through a network interface unit 28 connected to the bus 20. It should be appreciated that the network interface unit 28 may also be utilized to connect to other types of networks and remote computer systems.

The computer 10 may also include an input/output controller 30 for receiving and processing input from a number of input devices, including a keyboard 32, a mouse 34, a touchpad, a touch screen, an electronic stylus, or other type of input device. Similarly, the input/output controller 30 may provide output to a display device 36, such as a computer monitor, a flat-panel display, a digital projector, a printer, a plotter, or other type of output device. It will be appreciated that the computer 10 may not include all of the components shown in FIG. 4, may include other components that are not explicitly shown in FIG. 4, or may utilize an architecture completely different than that shown in FIG. 4.

Based on the foregoing, it should be appreciated that technologies for performing targeted, black box fuzzing of input data for application testing are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium encoded with computer-executable instructions that, when executed by one or more computers, cause the computers to:

receive a plurality of templates comprising input data for an application;

perform application tracing of the application as the application reads and processes the data contained in the plurality of templates to produce operation mapping data, wherein the operation mapping data is produced without requiring source code for the application, knowledge of a syntactical structure of the input data, or specially instrumented application modules;

receive a target operation in the application;

generate input data from the plurality of templates by fuzzing one or more data locations in the data contained in the plurality of templates based on the operation mapping data and the target operation; and cause the application to read and process the generated input data.

2. The computer-readable storage medium of claim 1, wherein a plurality of instances of input data are generated in succession with the one or more data locations of each instance of input data containing different values and the application is caused to read each successive instance of the input data until a desired outcome is achieved.

3. The computer-readable storage medium of claim 2, wherein the desired outcome comprises a crash of the application at the target operation.

4. The computer-readable storage medium of claim 2, wherein multiple, non-adjacent locations within the data contained in the plurality of templates are fuzzed collectively to generate each successive instance of the input data.

5. The computer-readable storage medium of claim 1, wherein the operation mapping data comprises a plurality of operation mappings, each of the plurality of operation mappings comprising a mapping of an individual data location in the data contained in one of the plurality of templates to an instruction address of an operation in the application executed while processing the input data from the data location.

6. The computer-readable storage medium of claim 5, wherein the one or more data locations in the data contained in the plurality of templates to fuzz are determined by selecting data locations from the operation mappings in the operation mapping data having an instruction address corresponding to the target operation in the application.

7. The computer-readable storage medium of claim 5, wherein the plurality of templates comprising syntactically correct input data for the application is read and processed by the application during the application tracing, and wherein each of the plurality of operation mappings in the produced operation mapping data further comprises an identification of the one of the plurality of templates containing the data location.

8. The computer-readable storage medium of claim 5, wherein the operation mapping data is optimized by removing redundant operation mappings having different data locations mapped to the same instruction address.

9. A computer-implemented method for performing targeted black box fuzzing of input data for an application without requiring source code for the application, knowledge of a syntactical structure of the input data, or specially instrumented application modules, the method comprising executing instructions on a computer to perform the operations of:

receiving template data comprising input data for the application;

performing application tracing of the application as the application reads and processes the template data to produce operation mapping data;

receiving a target operation in the application, wherein the target operation comprises a specific instruction in the application located at a specific instruction address;

generating a plurality of instances of input data from the template data by fuzzing one or more data locations in the template data based on the operation mapping data; and successively causing the application to read and process each of the plurality of instances of the input data until a desired outcome is achieved.

10. The computer-implemented method of claim 9, wherein the desired outcome comprises a crash of the application at the target operation.

11. The computer-implemented method of claim 9, wherein multiple, non-adjacent locations within the template data are fuzzed collectively to generate the plurality of instances of the input data.

12. The computer-implemented method of claim 9, wherein the operation mapping data comprises mappings of individual data locations in the template data to instruction addresses of operations in the application executed while processing the input data from the data locations.

13. The computer-implemented method of claim 12, wherein the one or more data locations in the template data to fuzz are determined by selecting data locations from the operation mapping data mapped to the instruction address of the target operation in the application.

14. The computer-implemented method of claim 12, wherein a set of template data comprising syntactically correct input data for the application is read and processed by the application during the application tracing, and wherein the operation mapping data further comprises an identification of the template data containing the data location.

15. The computer-implemented method of claim 12, wherein the operation mapping data is optimized by removing redundant data locations mapped to the same instruction address.

16. A system for performing targeted black box fuzzing of input data for an application without requiring source code for the application, knowledge of a syntactical structure of the input data, or specially instrumented application modules, the system comprising:

a dataflow tracing module executing on a computer and configured to
receive template data comprising syntactically correct input data for the application,
perform application tracing of the application as the application reads and processes the template data to produce operation mapping data comprising a plurality of operation mappings, each of the plurality of operation mappings comprising a mapping of an individual data location in the template data to an instruction address of an operation in the application executed while processing the input data from the data location, and
optimizing the operation mapping data by removing redundant data locations mapped to the same instruction address; and a fuzzing module executing on a computer and configured to
generate a plurality of instances of input data from the template data by fuzzing one or more data locations in the template data based on the operation mapping data, and
successively causing the application to read and process each of the plurality of instances of the input data until a desired outcome is achieved.

17. The system of claim 16, wherein the desired outcome comprises a crash of the application at the target operation.

18. The system of claim 16, wherein multiple, non-adjacent locations within the template data are fuzzed collectively to generate the plurality of instances of the input data.

19. The system of claim 16, wherein the one or more data locations in the template data to fuzz are determined by selecting data locations from the operation mappings in the operation mapping data having an instruction address corresponding to the target operation in the application.

20. The system of claim 16, wherein a set of template data comprising syntactically correct input data for the application is read and processed by the application during the application tracing, and wherein each of the plurality of operation mappings in the produced operation mapping data further comprises an identification of the template data containing the data location.

* * * * *